Sept. 2, 1941.     A. N. MILSTER     2,254,902
BRAKING SYSTEM CONTROLLED BY STEERING MECHANISM
Filed Feb. 23, 1940     2 Sheets-Sheet 1
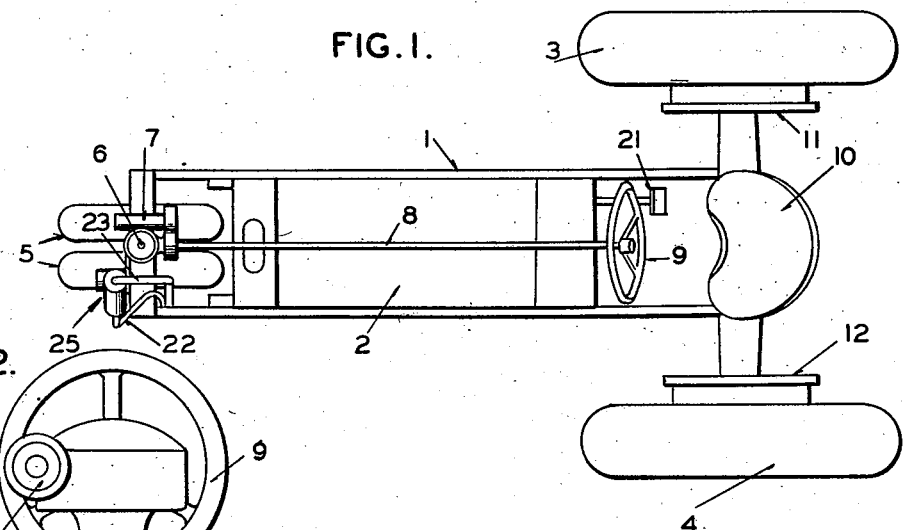
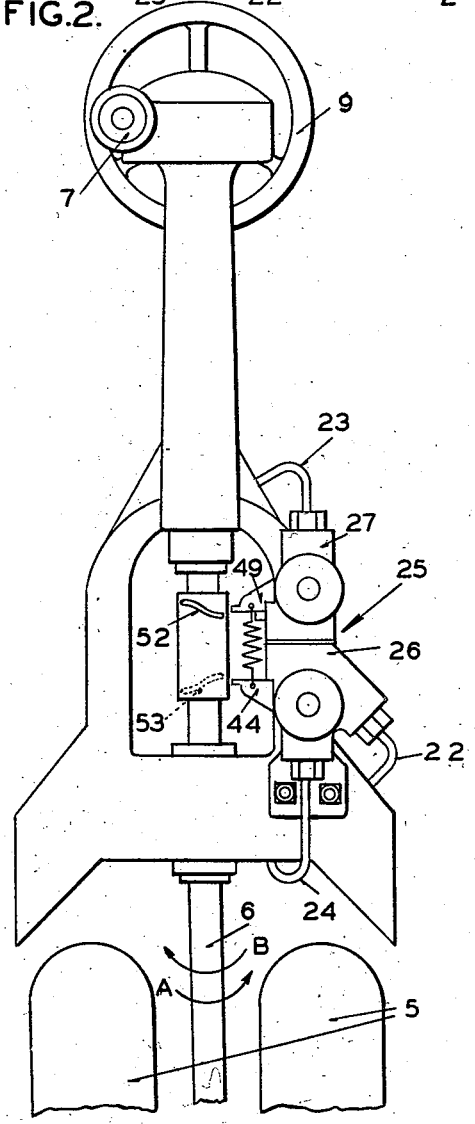
INVENTOR
A. N. MILSTER
BY
ATTORNEY

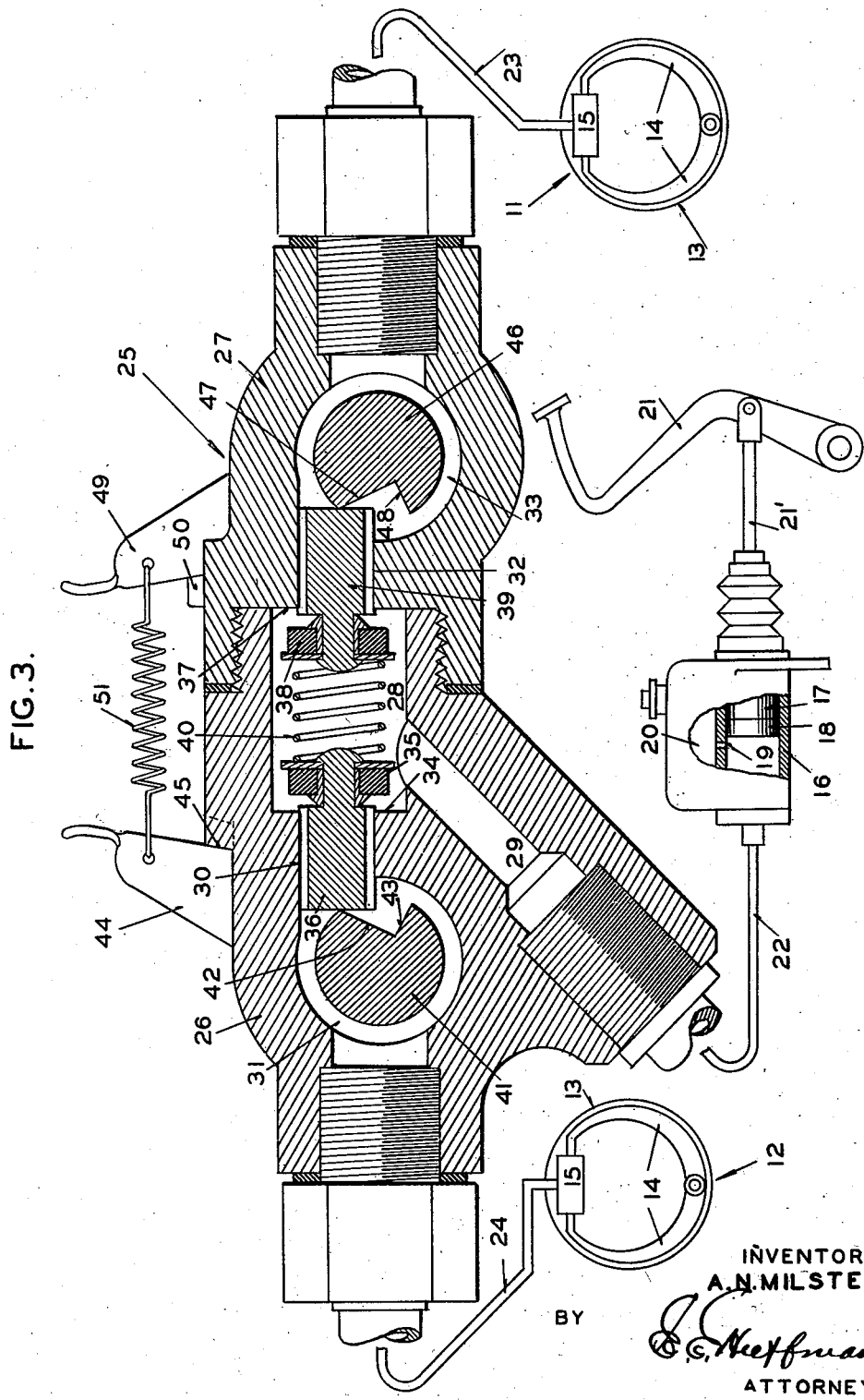

Patented Sept. 2, 1941

2,254,902

UNITED STATES PATENT OFFICE 2,254,902

BRAKING SYSTEM CONTROLLED BY STEERING MECHANISM

Arthur N. Milster, Ferguson, Mo., assignor to Wagner Electric Corporation, St. Louis, Mo., a corporation of Delaware Application February 23, 1940, Serial No. 320,266

4 Claims. (Cl. 180—18)

My invention relates to braking systems for vehicles and more particularly to a braking system that can be controlled in a manner to assist in steering the vehicle.

One of the objects of my invention is to produce a braking system for a vehicle which is so controlled by the steering mechanism of the vehicle that the brakes can be employed to assist in steering the vehicle.

Another and more specific object of my invention is to provide means controlled by the steering mechanism of a vehicle for disabling a portion of a fluid pressure actuated braking system when the steered wheels of the vehicle are turned to change the vehicle's direction of movement.

Other objects of my invention will become apparent from the following description taken in connection with the accompanying drawings in which Figure 1 is a schematic top view of a tractor vehicle provided with a braking system and control means embodying my invention; Figure 2 is a view showing the control valves and the manner in which they are controlled by the steering mechanism of the tractor; and Figure 3 is a schematic view showing the braking system as a whole and the manner in which the control valves are incorporated therein, the valves being shown in enlarged section.

Referring to the drawings in detail the structure embodying my invention is shown as being associated with a braking system and a steering mechanism of a farm tractor vehicle to assist in making short turns therewith but it may be associated with braking systems of other vehicles if found desirable. As shown in Figure 1, the tractor vehicle comprises a frame 1 on which is mounted an engine 2 for driving the two non-dirigible wheels 3 and 4 by suitable well known mechanism. A double dirigible wheel 5 is pivoted by a post 6 (Figure 2) on the front end of the frame for guiding the vehicle. The post is turned by a steering gear 7, a shaft 8 and a hand wheel 9 positioned adjacent the seat 10 for the operator. The right non-dirigible driving wheel 3 is provided with a brake assembly 11 and the left wheel 4 with a brake assembly 12. Each assembly is of known construction and as shown in Figure 3 comprises a drum 13 secured to the wheel and cooperating anchored shoes 14 actuated by a fluid motor 15.

The means for operating the fluid motors is a well known master cylinder device comprising a cylinder 16 having reciprocable therein a piston 17 and an associated packing cup 18. When the piston and cup are in their retracted position they uncover a port hole 19 for placing the cylinder in communication with a reservoir 20 to permit expansion and contraction of the fluid in the system and to also replenish any lost fluid. A piston rod 21' and brake pedal 21 are employed to reciprocate the piston. The master cylinder device is so mounted on the frame of the tractor that the pedal is convenient to the operator when sitting on the seat (see Figure 1). The outlet of the cylinder is connected by a conduit 22 and branch conduits 23 and 24 to the fluid motors 15 of the brake assemblies 11 and 12 respectively.

In accordance with my invention I interpose a valve mechanism 25 between the conduit 22 and the branch conduits 23 and 24. This valve mechanism comprising two shut-off valves whereby fluid may be prevented from flowing to either of the conduits 23 or 24 under certain conditions. The valve mechanism is enclosed in two casing members 26 and 27 screwed together to form a unit. The casing 26 is provided with a chamber 28 in constant communication by way of a passage 29 with the conduit 22 leading from the master cylinder. A second passage 30 places the chamber 28 in communication with a second chamber 31 in the casing member 26 which latter chamber constantly communicates with the conduit 24 leading to the fluid motor 15 of the brake assembly 12 on the left hand wheel 4. A passage 32 in the casing 27 also places the chamber 28 in communication with a chamber 33 which chamber constantly communicates with the conduit 23 leading to the fluid motor 15 of the brake assembly 11 on the right hand wheel 3.

The passage 30 in the casing member 26 has associated therewith a valve seat 34 and cooperating therewith is a valve element 35 carried by a fluted stem 36 positioned in the passage 30 and extending into the chamber 31. Similarly the passage 32 in the casing member 27 has associated therewith a valve seat 37 and cooperating with the seat is a valve element 38 carried by a fluted stem 39 positioned in the passage 32 and extending into the chamber 33. The valve elements 35 and 38 are in spaced axial alignment and have interposed between them a spring 40 tending to bias both elements toward their respective seats.

The control means for the valve element 35 comprises a shaft 41 journaled in the casing member 26 and positioned in the chamber 31. This shaft is formed with a cam 42 for cooperation with the end of the stem 36 in order to move the valve element 35 off its seat. The shaft is also provided with a shoulder 43 for engaging the side of the end of the stem to limit the rotated movement of the shaft in one direction. When the stop is engaged with the stem the cam is in such position that the valve element is seated under the action of the spring 40. The outer end of the shaft 41 carries an arm 44 for rotating the shaft and this arm cooperates with a stop 45 on the casing 26 to limit rotation of the shaft in a direction to cause the cam thereon to unseat the valve element 35. The control means for the valve element 38 is the same as that for the valve element 35 and comprises a shaft 46 journaled in the casing member 27 and positioned in the chamber 33. This shaft is provided with a cam 47 for cooperation with the end of the stem 39 and with a shoulder 48 for engaging the side of the stem to limit the movement of the shaft in one direction. The outer end of the shaft has secured thereto an arm 49 which cooperates with a stop 50 on the casing member 27 to limit the rotation of the shaft in a direction to cause the cam thereon to unseat the valve element 38.

In order that the valve elements may be normally held in open position a coil spring 51 is interposed between the two arms 44 and 49 and maintains these arms against their respective stops 45 and 50. With the arms in this position the cam 42 on shaft 41 will hold valve element 35 unseated and the cam 47 on shaft 46 will hold valve element 38 unseated. Thus fluid under pressure is free to flow from the master cylinder to both fluid motors 15 of the two brake assemblies or in the opposite direction to permit these brake assemblies to be applied and released simultaneously. If the valve element 35 should be caused to be seated by the movement of the arm 44 then when the master cylinder is operated the right hand brake assembly 11 only will be applied. Also if the valve element 38 should be caused to be seated by movement of the arm 49 then when the master cylinder is operated the left hand brake assembly only will be applied.

In order that the valve elements can be controlled by the steering mechanism and so control the brakes that they may be employed in assisting short turning of the tractor the valve mechanism is mounted on the front end of the frame of the tractor adjacent the post 6 for steering the double dirigible wheel 5. As shown in Figure 2 the mechanism for operating the valve elements comprises two axially spaced apart spiral cams 52 and 53. The cam 52 is on the front side of the post and the cam 53 on the rear side of the post when the post is in a position to cause the vehicle to move straight ahead. The cam 52 is adapted to actuate the lever 49 and the cam 53 the lever 44 and in order that these cams may properly cooperate with the levers the ends of said levers are given a half twist to provide flat surfaces. The cams 52 and 53 are so arranged that they do not operate the arms except upon predetermined rotation of this post from its straight ahead position for wheel 5. Because of the position of the cams and their relation to the levers the cam 52 will engage and operate the lever 49 so as to permit seating of the valve element 38 only when the steering post is turned to the left (as shown by arrow A) to make a short turn with the vehicle. When the steering post is turned to the right (as shown by arrow B) to make a short turn the cam 53 will engage and operate the lever 44 so as to permit seating of the valve element 35 only.

It is thus seen from the foregoing description that the braking system can be so controlled by the steering mechanism that the brakes can be employed to assist in steering the tractor. When it is desired to make a short right hand turn the steering mechanism will be moved so that the double dirigible wheel 5 and post 6 will be turned to its extreme position in the direction indicated by the arrow B. This will cause the cam 53 to operate the lever 44 and so position the shaft 41 that the valve element 35 will be seated. When the brakes are applied fluid under pressure can now only be transmitted to the fluid motor of the right hand brake assembly 11 and because of this wheel 3 will be held stationary. Since the left hand wheel will be free to be driven the vehicle can swing about the right hand wheel as a pivot. When it is desired to turn to the left the steering mechanism is moved to swing the steering post and wheel 5 to their extreme position in the direction of arrow A. This will cause cam 52 to engage and operate the arm 49 and so position the shaft 46 that the valve element 38 will be seated. When the brakes are applied fluid under pressure can only be transmitted to the left hand brake assembly 12 thus preventing the left hand wheel from turning. Since the right hand wheel will be free to be driven the vehicle can swing about the left hand wheel as a pivot.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a vehicle provided with a non-braked dirigible wheel and at least two other wheels, steering mechanism for the dirigible wheel including a steering column, a brake for each of said other wheels including a fluid motor, a source of fluid pressure, conduit means connecting the source to both fluid motors, a shut-off valve in the conduit means leading to each fluid motors, spring operated means for normally holding the valves open, and cam means carried by the steering column and operable when said column is turned a predetermined extent in one direction for so moving the spring operated means of one shut-off valve as to cause said valve only to be closed and when turned in the other direction for so moving the spring operated means of the other shut-off valve as to cause said valve only to be closed.

2. In braking apparatus, two brakes each including a fluid actuating motor, a source of fluid pressure, conduit means connecting the source to each fluid motor, a shut-off valve mechanism associated with the conduit means leading to each fluid motor and comprising a valve element biased toward closed position, a cam for holding said valve open and spring means for holding the cam in a position to maintain the valve open, a single control element movable in two directions from a central position, and means operable by the control element when moved in one direction for moving the cam of one valve element against its spring means and causing the valve element to assume a position permitting said element to be closed and when moved in the other direction for moving the cam of the other valve element against its spring means and causing the valve element to assume a position permitting said element to be closed.

3. In braking apparatus, two driving members, a brake for each of said members including a fluid motor, a source of pressure, conduit means connecting the source to each fluid motor, valve mechanism associated with the conduit means for selectively preventing fluid pressure from being transmitted from the source to each of the motors, said mechanism comprising a casing having a central chamber and two end chambers communicating therewith, said central chamber being in communication with the source and each end chamber being in communication with a fluid motor, valves for preventing fluid from flowing from the central chamber to the end chambers, a spring interposed between the valves for biasing them toward closed position, a cam for opening each valve, spring means for normally biasing the cams to positions holding both valves open, and means for selectively rotating the cams so as to permit one or the other of the valves to be closed.

4. In braking apparatus, two driving members, a brake for each of said members including a fluid motor, a source of pressure, conduit means connecting the source to each fluid motor, valve mechanism associated with the conduit means for selectively preventing fluid pressure from being transmitted from the source to each of the motors, said mechanism comprising a casing having a central chamber and two end chambers communicating therewith, said central chamber being in communication with the source and each end chamber being in communication with a fluid motor, valves for preventing fluid from flowing from the central chamber to the end chambers, a spring interposed between the valves for biasing them toward closed position, a cam for opening each valve, levers for rotating each cam independently of the other, spring means for normally holding the levers and cams in positions to hold both valves open, and means between the levers movable in opposite directions for selectively moving the levers so as to permit one or the other of the valves to be closed.

ARTHUR N. MILSTER.